United States Patent
Ishihara et al.

(10) Patent No.: US 10,104,159 B2
(45) Date of Patent: Oct. 16, 2018

(54) TASK PROCESSING METHOD, PROGRAM, AND SYSTEM

(71) Applicant: International Business Machines Corporation, Armonk, NY (US)

(72) Inventors: Tatsuya Ishihara, Kanagawa-ken (JP); Hironobu Takagi, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 928 days.

(21) Appl. No.: 14/028,722

(22) Filed: Sep. 17, 2013

(65) Prior Publication Data

US 2014/0095590 A1    Apr. 3, 2014

(30) Foreign Application Priority Data

Oct. 2, 2012   (JP) ................. 2012-220766

(51) Int. Cl.
| | |
|---|---|
| *H04L 29/08* | (2006.01) |
| *H04L 12/58* | (2006.01) |
| *G06Q 10/10* | (2012.01) |
| *H04L 12/26* | (2006.01) |
| *G06Q 10/06* | (2012.01) |

(52) U.S. Cl.
CPC ............ *H04L 67/10* (2013.01); *G06Q 10/06* (2013.01); *G06Q 10/101* (2013.01); *G06Q 10/103* (2013.01); *H04L 43/16* (2013.01); *H04L 51/32* (2013.01)

(58) Field of Classification Search
CPC .......... H04L 67/10; H04L 43/16; H04L 51/32
See application file for complete search history.

(56) References Cited

U.S. PATENT DOCUMENTS 6,792,412 B1 *   9/2004   Sullivan ............ G06F 17/30648
706/25

OTHER PUBLICATIONS

P. Welinder, S. Branson, S. Belongie, and P. Perona, "The multidimensional wisdom of crowds," In Proceedings of the 24th Annual Conference on Neural Information Processing Sys.

Pinar Donmez, Jaime G. Carbonell, and Jeff Schneider, "Efficiently learning the accuracy of labeling sources for selective sampling," In Proceedings of the 15th ACM SIGKDD int.

(Continued)

*Primary Examiner* — Aaron Strange
(74) *Attorney, Agent, or Firm* — Cantor Colburn LLP; Rabin Bhattacharya

(57) ABSTRACT

A contribution value necessary for achieving a target accuracy from a correct answer probability of each participant is calculated, a contribution value of the participant is added for an answer in accordance with the calculation, and it is set at a condition for determining completion of a task, that is, determining that a correct answer is obtained and no additional participant is necessary. The contribution value is calculated as the inverse of the number of participants at which the target accuracy is reached with a predetermined correct answer probability. The contribution value of the participant is added to the contribution value for the task in which that participant participates. At the time when the sum of the contribution values for a task exceeds one or when one option is certain to be a correct answer, the result having the largest sum of the contribution values is output.

15 Claims, 6 Drawing Sheets

(56) References Cited

OTHER PUBLICATIONS

Donmez et al., "Efficiently learning the accuracy of labeling sources for selective sampling," In Proceedings of the 15th ACM SIGKDD international conference on Knowledge discovery and data mining (KDD '09). ACM, New York, NY, USA, 259-268.

Welindeet al. (2011) The multidimensional wisdom of crowds. In: Advances in Neural Information Processing Systems 23 (NIPS 2010). Advances in Neural Information Processing Systems. No. 23. Information Processing Systems, La Jolla, CA, pp. 2424-2432.

* cited by examiner

TASK PROCESSING METHOD, PROGRAM, AND SYSTEM

CROSS-REFERENCE TO RELATED APPLICATION

This application claims priority under 35 U.S.C. § 119 from Japanese Patent Application No. 2012-220766 filed Oct. 2, 2012, the entire contents of which are incorporated herein by reference.

BACKGROUND OF THE INVENTION

The present invention relates to a technique such as crowdsourcing for processing a task by people using a computer system, and more specifically, it relates to a technique for ensuring accuracy of a task operation.

In recent years, as computer networks and web services have been developed, a business form called crowdsourcing, which is outsourced to a large number of unspecified individuals, has increased.

Crowdsourcing is a technique for performing a task in a collective intelligence way by distributing a task, such as addition of captions to images, transcribing speech information, or translation, that is technically difficult to be automated by a computer and that can be subdivided, to many people as micro-tasks.

The use of crowdsourcing enables a service that could not be achieved by automation by a computer, such as "service that returns description of objects appearing on any sent photograph." Thus crowdsourcing is used in various fields.

A problem in that case is that because of a characteristic of participation of many workers vary in quality and the quality cannot be ensured. For example, with the existing techniques, it is difficult to set a target of accuracy at 99%.

To ensure operation accuracy in crowdsourcing, techniques for integrating results of a plurality of participants have been proposed. Some examples of such related techniques are described below.

One known example is a majority scheme that is a technique for making a decision by means of a majority decision of answers of participants. However, because the majority scheme cannot consider the skills of participants, it has the drawback of low efficiency.

Another known example is a verification scheme using verification of an expert. The verification scheme ensures accuracy in a sense that verification based on expertise of an expert is conducted, but if a finite number of experts verify all tasks, the verifications cause a bottleneck in processing.

Still another known example is an additional majority scheme. For this technique, two persons first process a task, and if results are different, a majority decision is made. This technique has small expandability, and is required to combine with the verification scheme. To improve the above issues, techniques described in the papers listed below have been proposed.

P. Welinder, S. Branson, S. Belongie, and P. Perona, "The multidimensional wisdom of crowds," In Proceedings of the 24th Annual Conference on Neural Information Processing Systems (NIPS), 2010, pp. 2424-2432 discloses improving the accuracy in majority decision by estimating the skills of workers in crowdsourcing and integrating opinions of the workers on the basis of the estimated skills. This technique, however, cannot ensure target accuracy.

Pinar Donmez, Jaime G. Carbonell, and Jeff Schneider, "Efficiently learning the accuracy of labeling sources for selective sampling," In Proceedings of the 15th ACM SIGKDD international conference on Knowledge discovery and data mining (KDD '09), ACM, New York, N.Y., USA, 2009, pp. 259-268 discloses finding reliable workers as fast as possible from operation histories of workers in crowdsourcing, causing only the reliable workers to perform a task, and making a majority decision. This technique, however, is based on repeated operations by only reliable workers. Thus it is difficult to deal with a situation where less reliable workers are also contained to ensure a sufficient number of workers.

SUMMARY OF THE INVENTION

Accordingly, it is an object of the present invention to achieve crowdsourcing with a smaller number of persons at high operation accuracy.

An aspect of the present invention is a method of processing a task on a server computer using a joint activity of a plurality of participants at client computers connected to the server computer, the server computer storing at least one task Ti with N options wherein N is an integer equal to or larger than two, and a target accuracy for each task, the method including the steps of receiving a result of an operation for the task Ti from the client computer of each of the participants by the server computer, calculating a contribution value of each of the participants from a correct answer probability at a stage where a plurality of results of operations for the task Ti are received through the client computers on the basis of the results of the operations by the server computer, wherein the contribution value is an inverse of a number of persons at which the participants each providing the correct answer probability gather and the target accuracy is achieved, adding the calculated contribution value of the participant to a contribution value for the task Ti performed by the participant by the server computer; and outputting a result occurring when the sum of the contribution values for the task Ti exceeds a value that supports a predetermined condition as a result relating to the task Ti by the server computer.

The present invention is conceived to solve the above problems, and is directed to calculating a contribution value necessary for achieving a target accuracy from a correct answer probability of each participant (worker), adding a contribution value of the participant for an answer in accordance with the calculation, and setting it at a condition for determining completion of a task, that is, determining that a correct answer is obtained and no additional participant is necessary.

When a task is a majority decision task and a correct answer probability of a participant who participates in this majority decision task is constant at P, the entire correct answer probability in the case where n persons participate in the majority decision at the correct answer probability P is calculated by the following expression of a binominal distribution.

$$f(P, n) = \sum_{m=0}^{\lceil \frac{n}{2} \rceil - 1} \binom{n}{n-m} ((1-P)^m P^{n-m})$$ [Math. 1]

The sign $\lceil \ \rceil$ [Math. 2]

above Σ in the above expression represents a ceiling function. For example, $\lceil X \rceil$ [Math. 3]

indicates the smallest integer not less than X. The smallest number n when f(P,n) exceeds the target correct answer probability is considered to be a minimally necessary number Q of persons on the basis of the above expression, and 1/Q is set at a contribution value of the participant.

When the contribution value of the participant is calculated in the above way, the contribution value of that participant is added to the contribution value for the task in which the participant participates. The contribution value of that participant is also added to the contribution value for the selected option for each answer. At the time when the sum of the contribution values for a task exceeds one or when one option is certain to be a correct answer, a situation arises that even if contribution values of remaining participants are added, the contribution value for the option would not be exceeded by the contribution value for each of the other options, the result having the largest sum of the contribution values being the most likely is output.

The present invention may preferably implement the above-described processing on a web server that receives answers from client computers of participants.

In the present invention, the following conditions may preferably be set.

N types of tasks exist. The tasks are different, but have the same degree of difficulty.

A participant gives a correct answer at a probability higher than random numbers or >0.5 in the case of two options.

The number of participants is finite.

(A subset of) any participants participate in a task. The order is undetermined.

Participants perform a task only once.

A task having a "correct answer" and allowing a "correct answer probability" to be calculated is a subject.

The present invention can provide an advantage of achieving a target operation accuracy using a smaller number of participants than that in the related art by calculating a contribution value on the basis of a binomial distribution of correct answer probabilities of participants, adding the contribution value, and determining whether the target accuracy is achieved.

Figure 1:
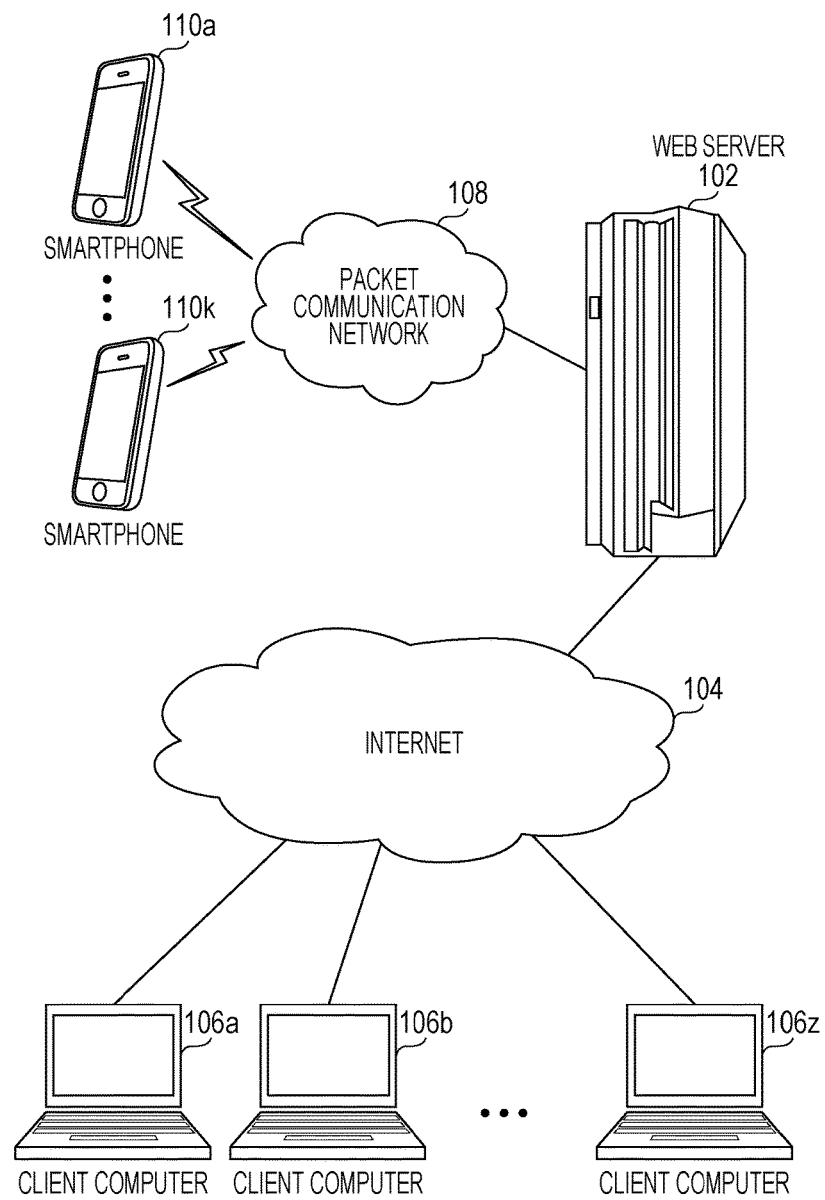
FIG. 1 illustrates a whole hardware configuration for carrying out the present invention.

Embodiments of the present invention are described below with reference to the drawings. These embodiments are the ones for use in describing preferable forms of the present invention, and it is to be understood that they are not intended to limit the scope of the invention to the description here. The same reference numerals indicate the same objects throughout the drawings unless otherwise specified.

In FIG. 1, a plurality of client computers 106a, 106b, . . . , 106z are connected to a Web server 102 over the Internet 104. In the system illustrated in FIG. 1, a user of a client computer logs into the Web server 102 over the lines of the Internet 104 through a Web browser. Specifically, the user inputs a predetermined uniform resource locator (URL) in the Web browser so that a predetermined page appears.

Figure 6:
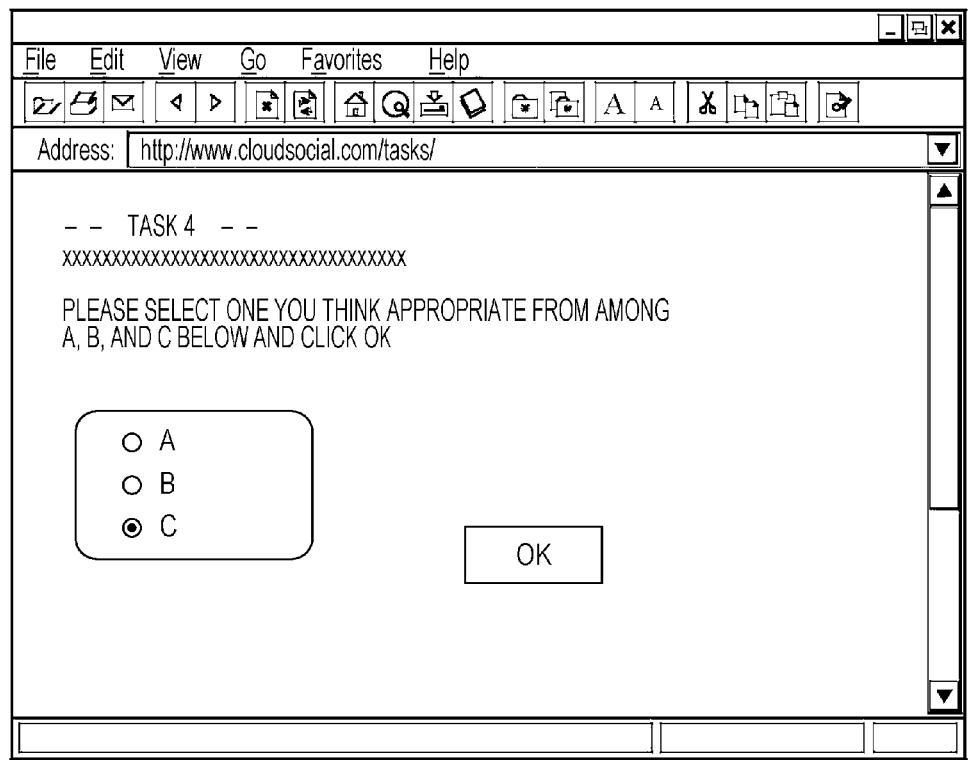
FIG. 6 illustrates a screen used when a worker performs a task.

In login, a user of a client computer uses a given user ID and its associated password. When the user of the client computer logs in, a task with N options is given by the Web server 102. Here, N is an integer equal to or larger than two. FIG. 6 illustrates an example screen appearing when a task with three options is displayed.

The Web server 102 is also connected to mobile terminals, such as smartphones 110a, . . . , 110k, over a packet communication network 108. A user can also access an SNS in the Web server 102 through a Web browser installed in a smartphone using a given ID and its associated password.

Figure 2:
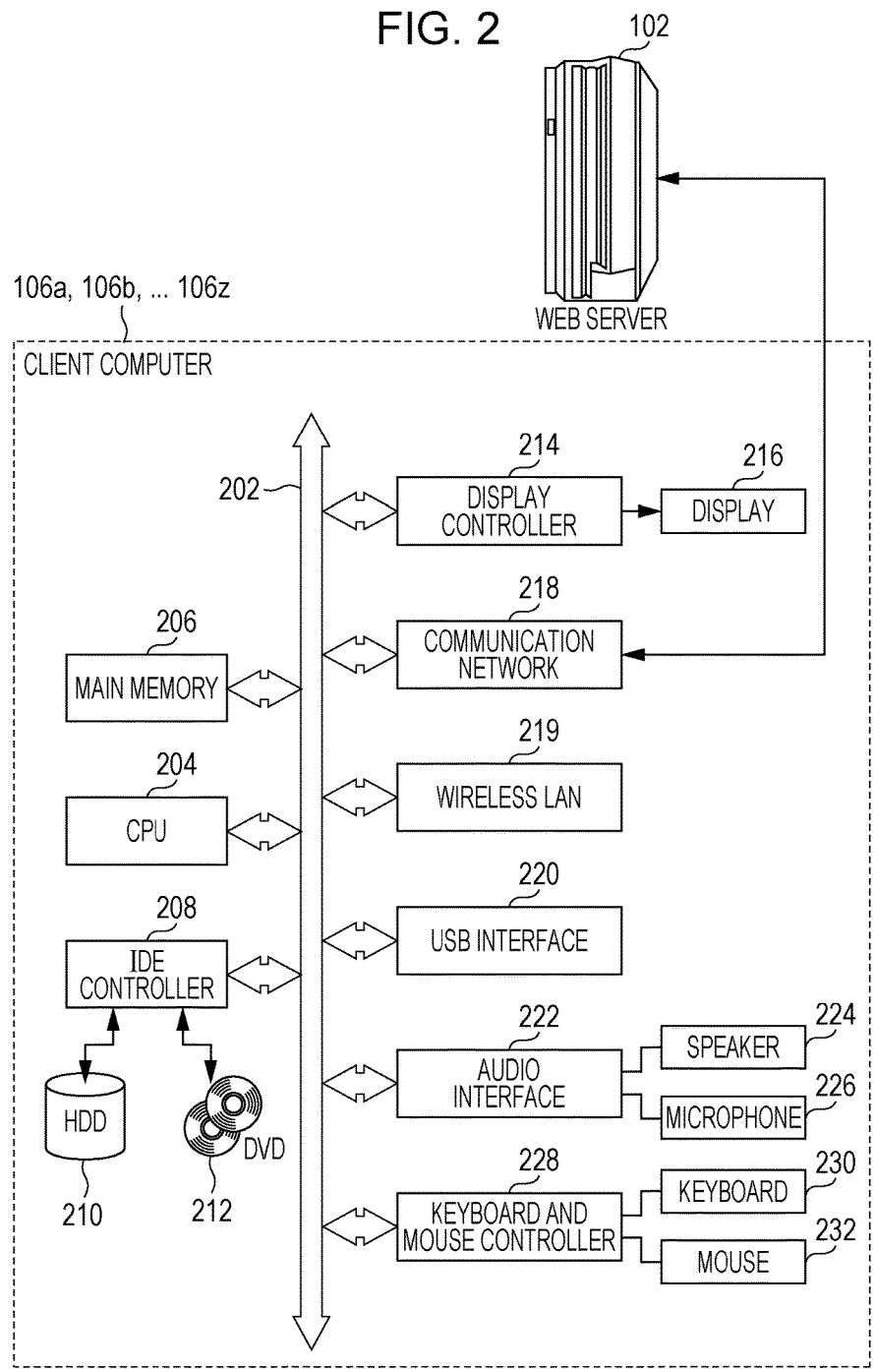
FIG. 2 is a block diagram of a hardware configuration of a client computer.

Next, the hardware block diagram of each of the client computers indicated with the reference numerals 106a, 106b, . . . , 106z in FIG. 1 is described with reference to FIG. 2. In FIG. 2, the client computer is typically a personal computer and includes a main memory 206, a central processing unit (CPU) 204, and an integrated drive electronics (IDE) controller 208. These components are connected to a bus 202. The bus 202 is also connected to a display controller 214, a communication interface 218, a universal serial bus (USB) interface 220, an audio interface 222, and a keyboard and mouse controller 228. The IDE controller 208 is connected to a hard disk drive (HDD) 210 and a digital versatile disk (DVD) drive 212. The DVD drive 212 is used in installing a program from a compact-disk read-only memory (CD-ROM) or a DVD if needed. The display controller 214 may preferably be connected to a display device 216 having a liquid crystal display (LCD) screen. The display device 216 displays a screen for use in performing a task through the Web browser. One example of the screen is illustrated in FIG. 6.

The USB interface 220 is used in connecting a device such as an external HDD if needed.

The keyboard and mouse controller 228 is connected to a keyboard 230 and a mouse 232. The keyboard 230 and mouse 232 are used in logging in a task performing screen by a participant and selecting an answer from N options on a screen, such as the one illustrated in FIG. 6.

The CPU 204 may be any one based on a 32-bit architecture or a 64-bit architecture, for example. Examples of the CPU 204 can include Pentium (trademark of Intel Corporation) 4 and Core™ 2 Duo of Intel Corporation and Athlon™ of Advanced Micro Devices, Inc (AMD).

The hard disk drive 210 stores at least an operating system and a Web browser (not illustrated) running on the operating system. At the time of the start-up of the system, the operating system is loaded into the main memory 206. Examples of the operating system can include Windows XP (trademark of Microsoft Corporation), Windows (trademark of Microsoft Corporation) 7, Linux (trademark of Linus Torvalds), and Mac OS X.

The hard disk drive 210 further installs a Web browser. The Web browser may preferably support JavaScript®, and examples of the Web browser can include, but not limited to, Internet Explorer, FireFox, and Google Chrome.

The communication interface 218 communicates with the Web server 102 using a TCP/IP communication function provided by the operating system with, for example, an Ethernet™ protocol.

The configuration of each of the client computers 106a, 106b, . . . , 106z is described above. The smartphones 110a, . . . , 110k have a configuration substantially equivalent to that of each of the client computers 106a, 106b, . . . , 106z, and the description thereof is omitted. The Web browser in each of the smartphones 110a, . . . , 110k also may preferably have the function of allowing JavaScript® to run.

Figure 3:
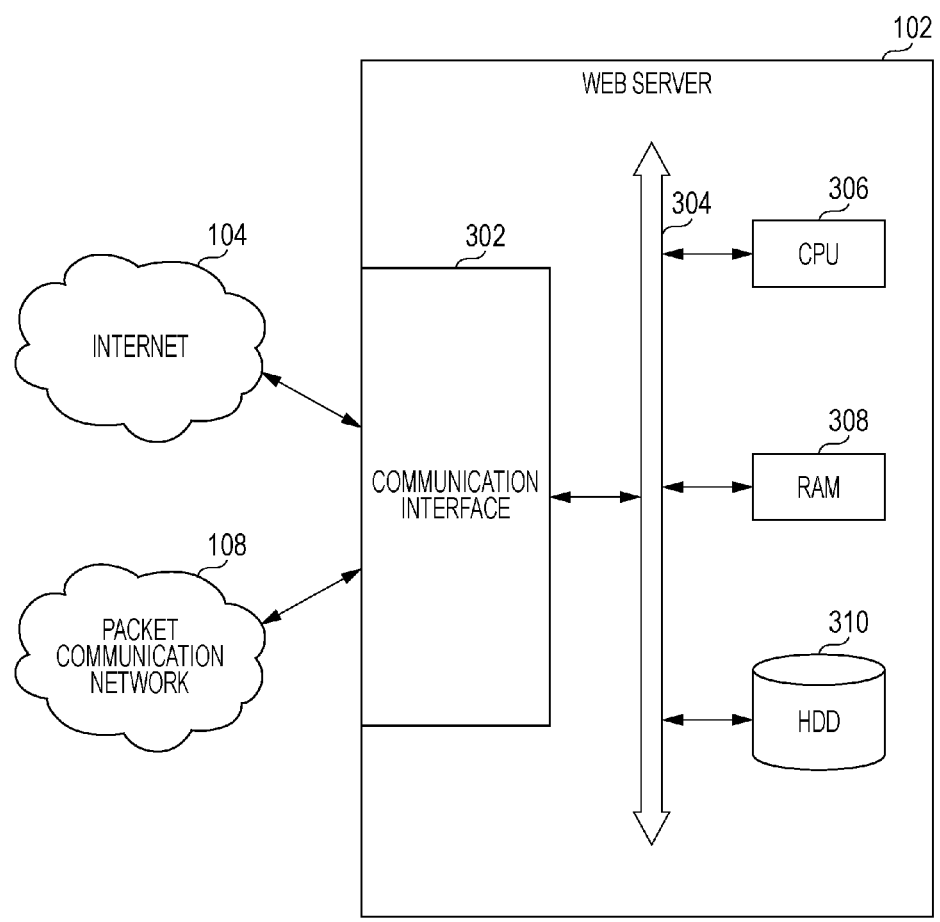
FIG. 3 is a block diagram of a hardware configuration of a Web server.

FIG. 3 is a schematic block diagram of a hardware configuration of the Web server 102. As illustrated in FIG. 3, the Internet 104, which is used for communicating with a client computer, and the packet communication network 108, which is used for communicating with a smartphone, are connected to a communication interface 302 of the Web server 102. The communication interface 302 is further connected to a bus 304. The bus 304 is connected to a CPU 306, a main memory (RAM) 308, and a hard disk drive (HDD) 310.

Although not illustrated, the Web server 102 may be further connected to a keyboard, a mouse, and a display, and these components may be used in controlling the Web server 102 in general and performing a maintenance operation.

The hard disk drive 310 in the Web server 102 stores the operating system and a correspondence table of user IDs and passwords for use in log-in management for the client computers 106a, 106b, . . . , 106z. The hard disk drive 310 further stores software such as Apache for enabling the Web server 102 to function as a Web server, and the software is loaded into the main memory 308 and runs at the time of the start-up of the Web server 102. With this, the client computers 106a, 106b, . . . , 106z can access the Web server 102 with a TCP/IP protocol.

Although not illustrated, the hard disk drive 310 in the Web server 102 also stores a communication module for communicating with a smartphone over the packet communication network 108.

The hard disk drive 310 further stores a main program 402, accuracy data 404, worker information 406, contribution value calculation module 408, a user response transmission and reception module 410, a task input module 412, task data 414, a result display module 416, and a user interface module 418. These components are described below with reference to the functional block diagram in FIG. 4.

As the above-described Web server 102, servers of models of IBM (trademark of International Business Machines Corporation) System X, System i, System p, and the like, which can be purchased from International Business Machines Corporation, can be used. In that case, examples of a usable operating system can include AIX (trademark of International Business Machines Corporation), UNIX (trademark of The Open Group), Linux (trademark of Linus Torvalds), and Windows™ 2003 server. In particular, in the present embodiment, Linux (trademark of Linus Torvalds) is used as the operating system, Java® EE is introduced thereon, server-side Java® is introduced, and the main program 402, contribution value calculation module 408, user response transmission and reception module 410, task input module 412, result display module 416, user interface module 418, and the like, which are processing programs in the present invention may preferably be implemented as Java® programs running thereon or in the form of Servelet. They may also be created using an existing programming language processing system, such as C, C++, and C#.

The processing elements for carrying out the present invention are described next with reference to the functional block diagram in FIG. 4. The main program 402 has the function of integrating the entire processing for achieving a predetermined operation accuracy and completing a task according to the present invention.

The accuracy data 404 is a preset target accuracy value for each of tasks T1, T2, . . . , Tn and is set in advance by an administrator of task processing.

The worker information 406 is data that contains an ID and a correct answer probability P of each registered worker, a login password of the worker, and other profile information.

The contribution value calculation module 408 has the function of calculating the smallest value n at which the following expression exceeds a target accuracy when the correct answer probability P of a worker and the target accuracy for the task are given, considering it as the number Q of persons necessary for achieving the target accuracy, and outputting 1/Q as the contribution value.

[Math. 4]
$$f(P, n) = \sum_{m=0}^{\lceil \frac{n}{2} \rceil - 1} \binom{n}{n-m}((1-P)^m P^{n-m})$$

The user response transmission and reception module 410 has the function of receiving a set of data elements indicating a task ID, a user ID, and a result of selection from N options of the task from the worker through the user interface module 418 and of returning a response if needed.

The task input module 412 extracts data on a specified task from the task data 414 in accordance with an instruction from the main program 402 and communicates with client computers of a plurality of registered workers in unison through the user interface module 418. The task data contains question items, the number of options, a message for each option, and the like to be displayed on the Web browser on each of the client computers.

The result display module 416 displays an option that has the largest contribution value of the options of the task as a true answer as a result of processing on a screen of a client computer of, for example, a user who is logging in as an administrator.

Before processing in the present invention is described, premises of the processing are described next. The premises are as follows:

N types of tasks exist. The tasks are different, but have the same degree of difficulty. That is, the target accuracies for the tasks are the same.

Tasks having N options are assumed (N is an integer equal to or larger than two). No task requiring a written answer is assumed.

A participant gives a correct answer at a probability higher than random numbers (>0.5 in the case of two options).

The number of participants is finite.

(A subset of) any participants participate in a task. The order is undetermined.

Participants perform a task only once.

A task having a "correct answer" and allowing a "correct answer probability" to be calculated is a subject.

The average correct answer percentage of participants who participated is used as the correct answer probability of a participant who participates for the first time. The correct answer probability of the participant who participates for the first time may also be set in accordance with accomplishment such as a career of some kind or a qualification.

In the premises described above, each of the degree of difficulty of each task and target accuracy therefor may not be set at the same value and may be set at a different value, depending on the case.

The correct answer probability of a participant remains unchanged until completion of processing after calculation of contribution value starts and the option having the largest contribution value is output. A correct answer probability of a participant who participated a plurality of times is set in accordance with his or her past correct answer percentage. This enables a participant who got a high correct answer percentage to provide a high contribution value.

Figure 4:
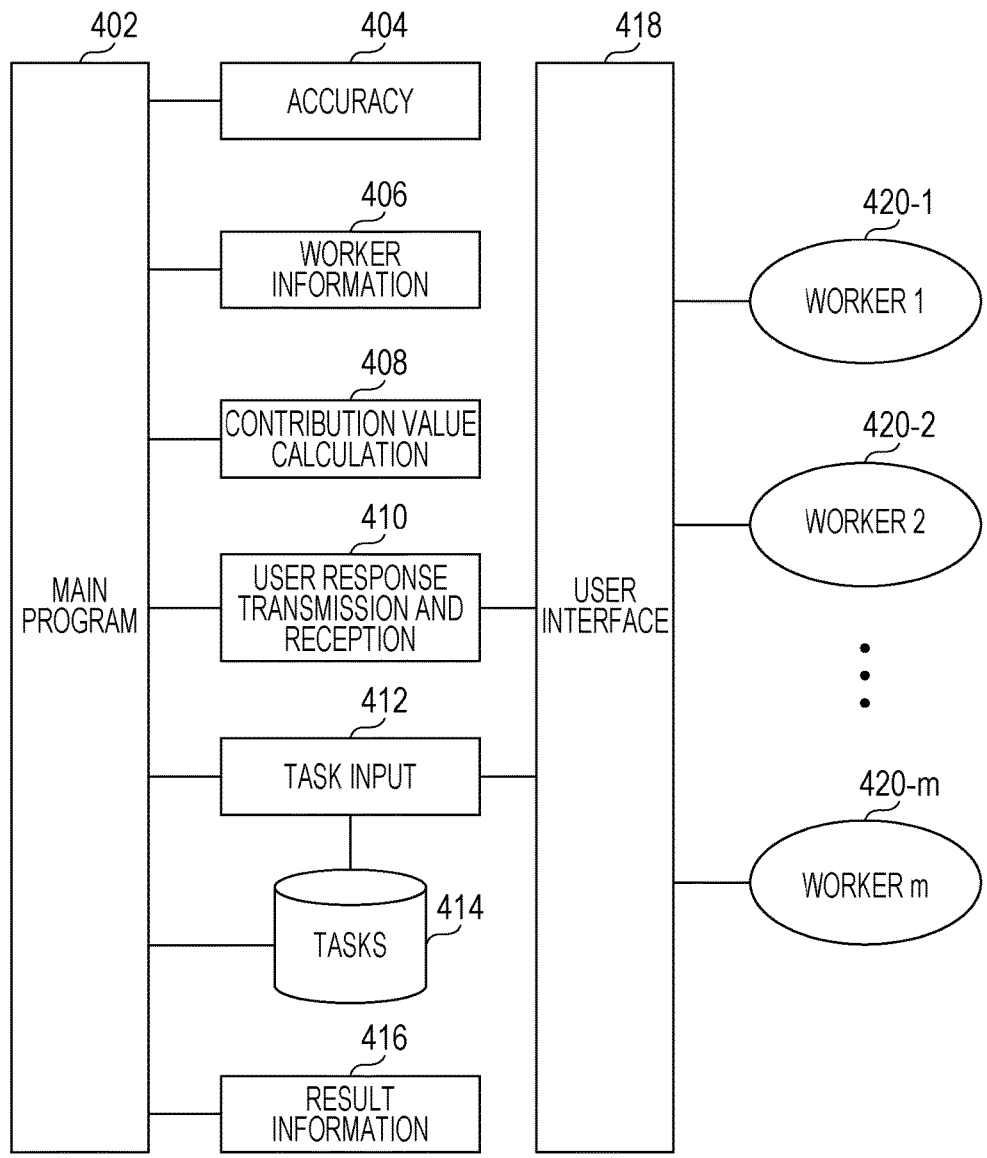
FIG. 4 is a block diagram of a functional configuration according to an embodiment of the present invention.
Figure 5:
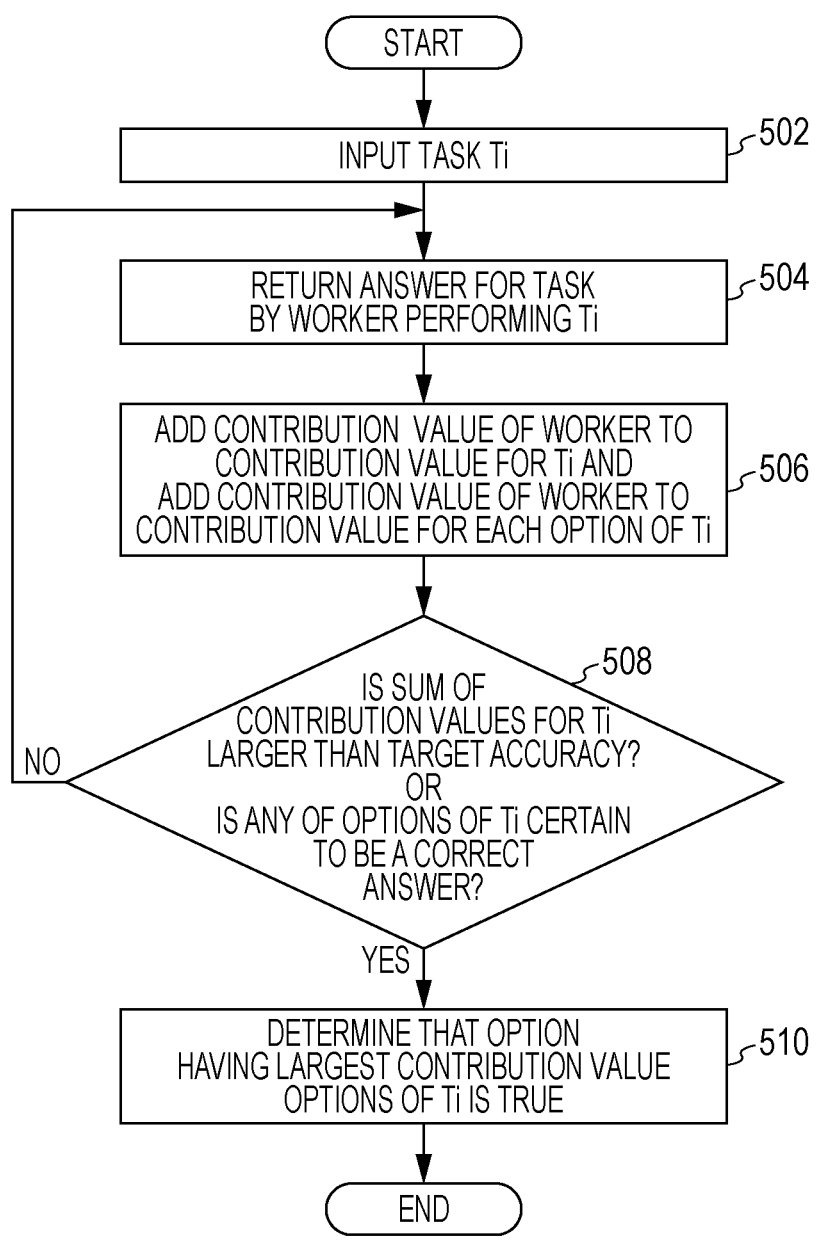
FIG. 5 is a flowchart of processing according to the embodiment of the present invention.

Here, referring to the flowchart in FIG. 5, users (participants) 420_1, 420_2, . . . , 420_m attempt to log in the system illustrated in FIG. 4 with their respective user IDs and predetermined passwords. The users 420_1, 420_2, . . . , 420_m may log in from smartphones or may log in from client computers, as illustrated in FIG. 1. The user IDs and passwords sent from the users are sent to the main program 402 through the user interface module 418 and user response transmission and reception module 410. In response to this, the main program 402 refers to the worker information 406 and performs user authentication.

At step 502, the main program 402 calls the task input module 412, obtains data on a task Ti from the task data 414, and sends the data to the users 420_1, 420_2, . . . , 420_m, who are logging in the task, through the user interface module 418. The main program 402 prepares a variable ti_c and a variable array ti_s[N] corresponding to the task Ti and initializes them to ti_c=0 and ti_s[0]=ti_s[1]= . . . = ti_s[N]=0. Here, ti_c is a variable that stores the entire contribution value of the task Ti, and ti_s[N] is a variable that stores a contribution value for each option.

The main program 402 further obtains data Ai on a predetermined accuracy for the task Ti from the accuracy data 404.

In response to data transmission from the task input module 412, a screen, such as the one displaying an explanation and radio buttons corresponding to N options which are three options in this case, illustrated in FIG. 6, appears in the browser of the client computer of each of the users 420_1, 420_2, . . . , 420_m on the basis of the content stored as the task data 414 relating to the task Ti.

At step 504, in the case of the example illustrated in FIG. 6, a user who has not yet given an answer provides an answer by reading the explanation, clicking on the radio button corresponding to A, B, or C according to the instruction thereof, and clicking on OK. The answer is sent to the main program 402 through the user interface module 418 and user response transmission and reception module 410.

At step 506, the main program 402 obtains the correct answer probability P of the user from the worker information 406 on the basis of the user ID corresponding to the received answer. Then the main program 402 calls the contribution value calculation module 408 using the accuracy data Ai and correct answer probability P as arguments and calculates the contribution value.

The contribution value calculation module 408 calculates n at which f(P,n) just exceeds Ai using the function f(P,n) defined by the following expression.

$$f(P, n) = \sum_{m=0}^{\lceil \frac{n}{2} \rceil - 1} \binom{n}{n-m}((1-P)^m P^{n-m})$$ [Math. 5]

This can be expressed as calculation written in the form of pseudocode like the C language as follows:
n=1;
while (f(P,n)<Ai)n++;

f(P,n) is a monotone increasing function that approaches one as n increases, 0<Ai<1, and thus the value of n can be easily found.

Using n obtained as a result of the calculation, 1/n is calculated as the contribution value.

ti_c+=1/n; // The contribution value of the worker is added to the contribution value for the task Ti.

ti_s[S]+=1/n; // The contribution value of the worker is added to the contribution value for the option.

Here, S is the number of an option selected by the user, and S=k indicates that the (k+1)-th option is selected. In the case of the example illustrated in FIG. 6, S=2.

At step 508, the main program 402 determines whether ti_c, which is the sum of the contribution values for Ti, is larger than the target accuracy (e.g., one) or whether any one of the options of Ti is certain to be a correct answer.

Here, the situation that any one of the options of Ti is certain to be a correct answer is wherein the sum of the contribution values for the most likely option—the sum of the contribution values for the second most likely option>1—the sum of the contribution values of all of the participants performing the task is satisfied.

At step 508, when the main program 402 determines that the sum of the contribution values for Ti does not exceed the target accuracy and that none of the options of Ti is certain to be a correct answer, the processing returns to step 504 and waits for an answer from a user who has not yet given an answer.

In contrast, when ti_c, which is the sum of the contribution values for Ti, is larger than the target accuracy or when any one of the options of Ti is certain to be a correct answer, at step 510, the main program 402 determines that the option having the largest contribution value, that is, the option j at which ti_s[j] is the largest is a true answer and informs the administrator for the task of the result using the result display module 416.

In the processing about the task Ti described above, the main program 402 may move to inputting of the next task at the time when the option having the largest contribution value for one task is determined or may input different tasks to users at random.

The theoretical contribution values and the numbers of voters necessary for correct answer percentage 99% for predetermined correct answer probabilities are provided in the table below.

TABLE 1

| Correct Answer Probability | Number of Voters Necessary for Correct Answer Percentage 99% | Theoretical Contribution Value |
|---|---|---|
| 0.51 | 13527 | 7.39262E−05 |
| 0.55 | 538 | 0.001858736 |
| 0.6 | 133 | 0.007518797 |
| 0.7 | 31 | 0.032258065 |
| 0.8 | 13 | 0.076923077 |
| 0.9 | 5 | 0.2 |
| 0.944 | 3 | 0.333333333 |
| 0.99 | 1 | 1 |

The embodiment is described above using an example established as a Java®-based client server system. The present invention is not limited to a particular platform and can be achieved under any hardware, operating system, programming processing system or network environment.

Any task having N options can be used. The technique in the present invention is also applicable to a task in which a plurality of options can be selected at a time.

The invention claimed is:
1. A method of processing a task on a server computer using a joint activity of a plurality of participants at client computers connected to the server computer, the method comprising the steps of:
   storing, on the server computer, at least one task Ti with N options, wherein N is an integer equal to or larger than two, and a target accuracy for each task;
   receiving a result of an operation for the task Ti from the client computer of each of the plurality of participants by the server computer;
   calculating a contribution value of each of the plurality of participants from a correct answer probability at a stage where a plurality of results of operations for the task Ti are received through the client computers on the basis of the results of the operations by the server computer, wherein the contribution value is an inverse of a number of persons at which the plurality of participants each providing the correct answer probability gather and the target accuracy is achieved, and wherein the contribution value is given by calculating an entire correct answer probability when n persons participate in majority decision with correct answer probability P from the following expression:

$$f(P, n) = \sum_{m=0}^{\lceil \frac{n}{2} \rceil - 1} \binom{n}{n-m} ((1-P)^m P^{n-m}),$$

calculating a number Q of persons minimally necessary for achieving a target correct answer probability on the basis of the above expression, and calculating a value of 1/Q as the contribution value;
   adding the calculated contribution value of the participant to a contribution value for the task Ti performed by the participant by the server computer; and
   outputting a result occurring when the sum of the contribution values for the task Ti exceeds a value that supports a predetermined condition as a result relating to the task Ti by the server computer.

2. The method according to claim 1, wherein the predetermined condition is that the sum of the contribution values reaches one.

3. The method according to claim 1, further comprising:
   a step of adding the contribution value for each option of the task,
   wherein the predetermined condition is that one option is certain to be a correct answer.

4. The method according to claim 3, wherein being certain to be a correct answer is wherein the sum of the contribution values for the most likely option—the sum of the contribution values for the second most likely option>1—the sum of the contribution values of all of the participants performing the task is satisfied.

5. The method according to claim 4, wherein the step of outputting the result as the result relating to the task Ti includes a step of outputting an option having the largest contribution value.

6. A program product for processing a task on a server computer using a joint activity of a plurality of participants at client computers connected to the server computer, the program product comprising a computer readable storage medium having program instructions embodied therewith, wherein the computer readable storage medium is not a transitory signal per se, the program instructions readable by the server computer to cause the server computer to perform a method comprising:
   storing, on the server computer, at least one task Ti with N options, wherein N is an integer equal to or larger than two, and a target accuracy for each task;
   receiving a result of an operation for the task Ti from the client computer of each of the plurality of participants by the server computer;
   calculating a contribution value of each of the plurality of participants from a correct answer probability at a stage where a plurality of results of operations for the task Ti are received through the client computers on the basis of the results of the operations by the server computer, the contribution value being an inverse of a number of persons at which the plurality of participants each providing the correct answer probability gather and the target accuracy is achieved, and wherein the contribution value is given by calculating an entire correct answer probability when n persons participate in majority decision with correct answer probability P from the following expression:

$$f(P, n) = \sum_{m=0}^{\lceil \frac{n}{2} \rceil - 1} \binom{n}{n-m} ((1-P)^m P^{n-m}),$$

calculating a number Q of persons minimally necessary for achieving a target correct answer probability on the basis of the above expression, and calculating a value of 1/Q as the contribution value;
   adding the calculated contribution value of the participant to a contribution value for the task Ti performed by the participant by the server computer; and
   outputting a result occurring when the sum of the contribution values for the task Ti exceeds a value that supports a predetermined condition as a result relating to the task Ti by the server computer.

7. The program product according to claim 6, wherein the predetermined condition is that the sum of the contribution values reaches one.

8. The program product according to claim 6, further comprising:
   a step of adding the contribution value for each option of the task,
   wherein the predetermined condition is that one option is certain to be a correct answer.

9. The program product according to claim 8, wherein being certain to be a correct answer is wherein the sum of the contribution values for the most likely option—the sum of the contribution values for the second most likely option>1—the sum of the contribution values of all of the participants performing the task, is satisfied.

10. The program product according to claim 9, wherein the step of outputting the result as the result relating to the task Ti includes a step of outputting an option having the largest contribution value.

11. A system for processing a task on a server computer using a joint activity of a plurality of participants at client computers connected to the server computer, the system comprising:
   a memory; and
   a processor communicatively coupled to the memory, wherein the processor is configured to:

store, on the server computer, at least one task Ti with N options, wherein N is an integer equal to or larger than two, and a target accuracy for each task;

receive a result of an operation for the task Ti from the client computer of each of the plurality of participants;

calculate a contribution value of each of the plurality of participants from a correct answer probability at a stage where a plurality of results of operations for the task Ti are received through the client computers on the basis of the results of the operations, the contribution value being an inverse of a number of persons at which the plurality of participants each providing the correct answer probability gather and the target accuracy is achieved, and wherein the contribution value is given by calculating an entire correct answer probability when n persons participate in majority decision with correct answer probability P from the following expression:

$$f(P, n) = \sum_{m=0}^{\lceil \frac{n}{2} \rceil - 1} \binom{n}{n-m}((1-P)^m P^{n-m}),$$

calculating a number Q of persons minimally necessary for achieving a target correct answer probability on the basis of the above expression, and calculating a value of 1/Q as the contribution value;

add the calculated contribution value of the participant to a contribution value for the task Ti performed by the participant; and output a result occurring when the sum of the contribution values for the task Ti exceeds a value that supports a predetermined condition as a result relating to the task Ti.

12. The system according to claim 11, wherein the predetermined condition is that the sum of the contribution values reaches one.

13. The system according to claim 11, further comprising: the processor configured to:
add the contribution value for each option of the task,
wherein the predetermined condition is that one option is certain to be a correct answer.

14. The system according to claim 13, wherein being certain to be a correct answer is wherein the sum of the contribution values for the most likely option—the sum of the contribution values for the second most likely option>1—the sum of the contribution values of all of the participants performing the task, is satisfied.

15. The system according to claim 14, wherein the means for outputting the result as the result relating to the task Ti outputs an option having the largest contribution value.

* * * * *